United States Patent
Law

(10) Patent No.: US 7,318,447 B2
(45) Date of Patent: Jan. 15, 2008

(54) PRESSURE LOADED PILOT SYSTEM AND METHOD FOR A REGULATOR WITHOUT ATMOSPHERIC BLEED

(75) Inventor: Stephanie Marie Law, McKinney, TX (US)

(73) Assignee: Fisher Controls International LLC., St. Louis, MO (US)

( * ) Notice: Subject to any disclaimer, the term of this patent is extended or adjusted under 35 U.S.C. 154(b) by 53 days.

(21) Appl. No.: 10/761,761

(22) Filed: Jan. 21, 2004

(65) Prior Publication Data

US 2005/0155651 A1    Jul. 21, 2005

(51) Int. Cl.
*G05D 16/20* (2006.01)
*F15B 13/043* (2006.01)

(52) U.S. Cl. ............ 137/487.5; 137/14; 137/488; 251/30.01

(58) Field of Classification Search ........... 137/14, 137/487.5, 102, 505.37; 251/28, 30.01, 29
See application file for complete search history.

(56) References Cited

U.S. PATENT DOCUMENTS

| | | | | |
|---|---|---|---|---|
| 4,084,539 A | * | 4/1978 | Schmidt | 118/685 |
| 5,047,965 A | * | 9/1991 | Zlokovitz | 700/282 |
| 5,460,196 A | * | 10/1995 | Yonnet | 137/12 |
| 6,338,358 B1 | * | 1/2002 | Watanabe et al. | 137/102 |
| 6,371,156 B1 | | 4/2002 | Walton et al. | |
| 6,779,541 B2 | * | 8/2004 | Inayama et al. | 137/102 |

FOREIGN PATENT DOCUMENTS

| | | |
|---|---|---|
| GB | 2 252 848 | 8/1992 |
| GB | 2 323 683 | 9/1998 |
| WO | WO 00/75741 A1 * | 12/2000 |
| WO | WO 01/22187 A1 | 3/2001 |

OTHER PUBLICATIONS

International Search Report in PCT/US04/042083 dated Mar. 2, 2005.
Written Opinion in PCT/US04/042083 dated Mar. 2, 2005.
International Preliminary Report on Patentability dated Jul. 24, 2006.

* cited by examiner

*Primary Examiner*—Ramesh Krishnamurthy
(74) *Attorney, Agent, or Firm*—Marshall, Gerstein & Borun LLP

(57) ABSTRACT

A pressure loaded pilot valve system and method for a regulator valve is provided. The system includes a regulator valve connecting an inlet line to an outlet line, a servo control valve assembly, and a pilot valve assembly. A supply line is connected to the servo control valve, and a pilot loading pressure line connects the servo control valve to the pilot valve assembly An exhaust line connects the servo control valve to the outlet line, thereby avoiding waste, pollution, etc. associated with bleeding excess pilot pressure to the atmosphere.

9 Claims, 2 Drawing Sheets

PRESSURE LOADED PILOT SYSTEM AND METHOD FOR A REGULATOR WITHOUT ATMOSPHERIC BLEED

FIELD OF THE DISCLOSURE

This disclosure is related generally to methods and apparatuses for controlling regulators and, more particularly, to improvements in systems and methods for operating pressure loaded pilot valves for regulators.

BACKGROUND OF THE INVENTION

Fluid handling systems that include regulators often include a pilot valve to facilitate control over the regulator. Often, the fluid used in the pilot valve is the same fluid that is being controlled by the regulator. For example, if the fluid being handled by the regulator is natural gas, a portion of natural gas may be diverted to be used in the pilot valve to control the regulator. Loading pressure in the pilot valve is used to adjust the set point of the system. The loading pressure must be reduced when the set point needs to be lowered. Many systems accomplish this by bleeding excess fluid to the atmosphere. However, bleeding excess fluid to the atmosphere may be undesirable in some situations, such as when natural gas is used as a loading pressure fluid for the pilot valve, because of possible adverse environmental effects, and/or the additional risk of fire, if the bleeding of excess fluid occurs in a confined area.

SUMMARY OF THE INVENTION

A pressure loaded pilot valve system for a regulator valve includes a regulator valve connecting an inlet line carrying fluid at an inlet pressure to an outlet line carrying fluid at an outlet delivery pressure. The system further includes a servo control valve assembly, a pilot valve assembly, a supply line connected to the servo control valve assembly, carrying fluid at a supply pressure, and a pilot loading pressure line connecting the servo control valve assembly to the pilot valve assembly, carrying fluid at a pilot loading pressure. An exhaust line connects the servo control valve assembly to the outlet line, carrying fluid at an exhaust pressure.

DETAILED DESCRIPTION

Figure 1:
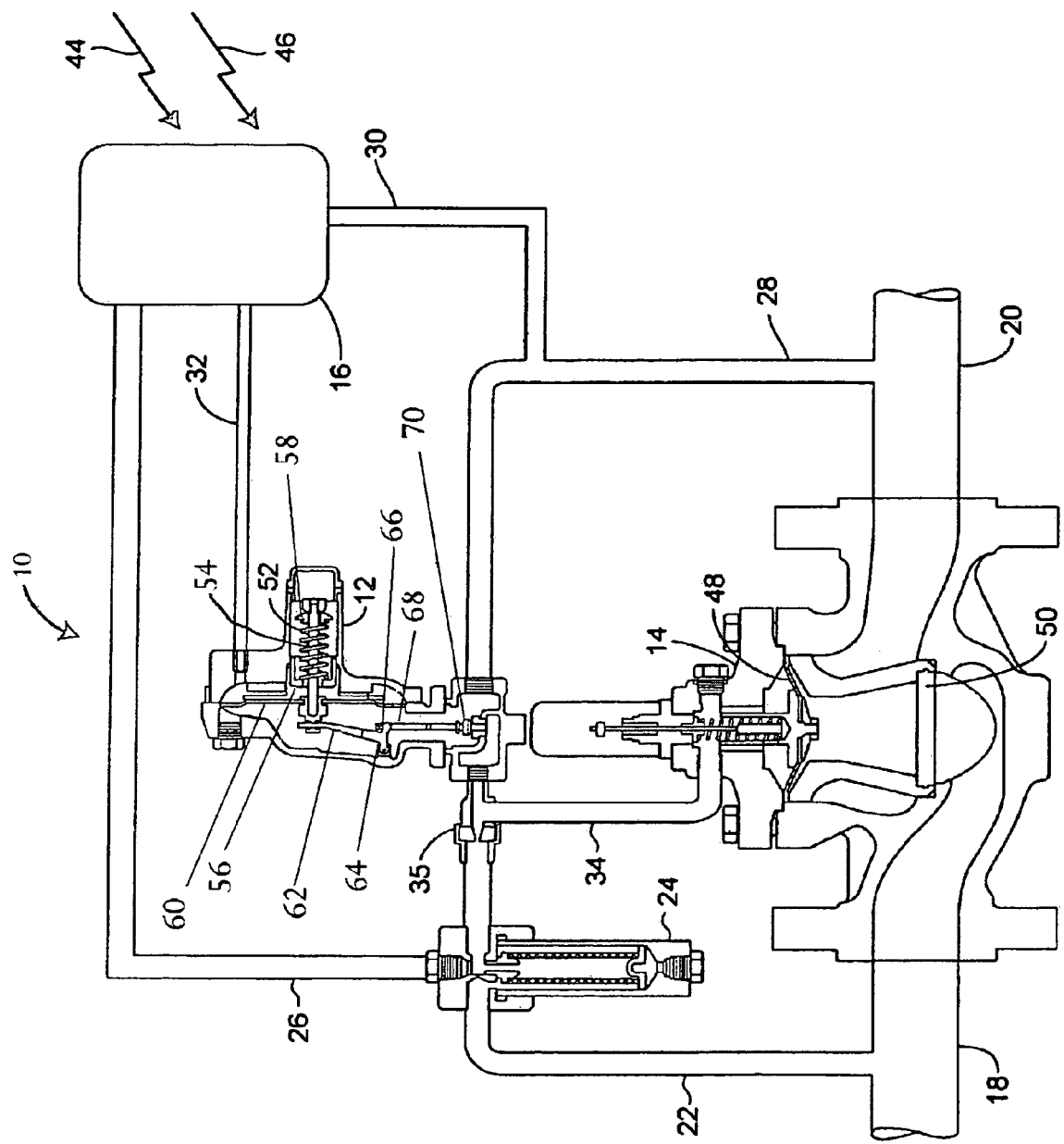
FIG. 1 is a schematic representation of a pressure loaded pilot valve system for a regulator valve.

With reference initially to FIG. 1, a pressure loaded pilot valve system, generally indicated at 10, includes a pilot valve 12 operatively connected to a regulator valve 14 and a servo control valve assembly 16. The servo control valve assembly 16 may include a commercially available servo control valve, such as the QB2T servo control valve, available from Proportion-Air, Inc.

A main supply line 18 provides fluid flow at a supply pressure level to the regulator valve 14, and a main outlet line 20 leads from the regulator valve 14 and carries fluid at an outlet delivery pressure. A pilot supply line 22 connects the main supply line 18 to the servo control valve assembly 16.

A filter assembly 24, that may include a water separation capability, may be connected to the supply line 22 and the servo control valve assembly 16 by a servo supply line 26. A pilot control line 28 may connect the pilot valve 12 to the main outlet line 20 and may also be connected to the servo control valve assembly 16 by a servo exhaust line 30. A pilot loading pressure line 32 connects the servo control valve assembly 16 to the pilot valve 12, and a main valve loading pressure line 34 connects the pilot valve 12 to the regulator valve 14. A fixed restrictor 35 maybe provided between the filter assembly 24 and the main valve loading pressure line 34.

Figure 2:
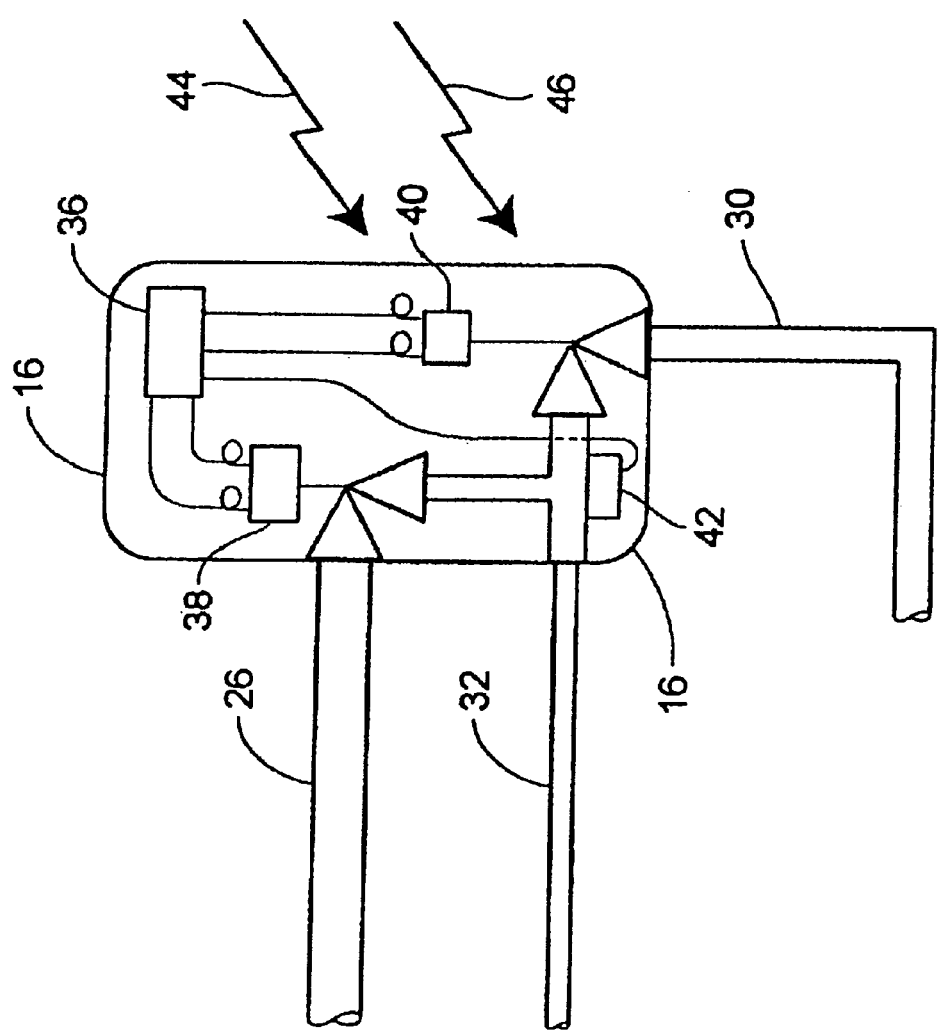
FIG. 2 is an enlarged schematic view of a servo control valve assembly that may be used in the system depicted in FIG. 1.

With reference to FIG. 2, the servo control valve assembly 16 may include an electronic control unit 36, that may be operatively connected to a supply pressure solenoid valve 38, an exhaust pressure solenoid valve 40, and a loading pressure transducer 42. Each of the solenoid valves 38 and 40 may be a two-way normally closed solenoid valve. The loading pressure transducer 42 senses the loading pressure in the pilot loading pressure line 32. The servo control valve assembly 16 may be provided with external control signals through a control cable 44 and may be provided power through a power cable 46.

In operation, the pressure loaded pilot valve system 10 may operate as follows. The pilot valve 12, which may be a spring-to-close device, is used to actuate the regulator valve 14. For example, the regulator valve 14 may include a diaphragm 48 that is operatively connected to a valve plug 50, and the pilot valve 12 may be used to adjust the fluid pressure in the main valve loading pressure line 34.

More specifically, the pilot valve 12 may include a pilot valve spring 52, surrounding a pilot valve puller post 54. The pilot valve spring 52 may be adjusted to a desired bias set point. The pilot valve spring 52 may be placed in compression between a stationary cup-shaped portion 56 of the pilot valve 12 and an adjustable stop-nut 58 that may threadably attached to the pilot valve puller post 54. The pilot valve puller post 54 may be attached to a pilot valve diaphragm 60 and also to a pilot bell crank lever 62. A first leg 64 of the pilot bell crank lever 62 is pivotally attached to the pilot valve 12 and a second leg 66 of the bell crank lever 62 is pivotally attached to a pilot valve stem 68 that carries a pilot valve plug 70.

With the aforementioned arrangement, the pilot valve spring 52 urges the pilot valve puller post 54 and the pilot valve diaphragm 60 to the right as oriented in FIG. 1, thus urging the pilot valve plug 70 toward a closed position, via the pilot bell crank lever 62 and the pilot valve stem 68. If sufficient fluid pressure is applied through the pilot loading pressure line 32 to the pilot valve diaphragm 60, the pilot valve diaphragm 60 urges the pilot valve puller post 54 to the left as oriented in FIG. 1, thus urging the pilot valve plug 70 toward an open position, via the pilot bell crank lever 62 and the pilot valve stem 68.

The fluid pressure in the pilot loading pressure line 32 may be adjusted to a desired set point of the pressure loaded pilot valve system 10. The fluid pressure in the pilot loading pressure line 32 may be used to overcome the spring setting of the pilot valve 12, and thus the fluid pressure in the pilot loading pressure line 32 will be greater than the fluid pressure in each of the main outlet line 20, the pilot control line 28, and the servo exhaust line 30. When the set point needs to be lowered, excess pressure in the pilot loading pressure line 32 may be vented by opening the exhaust pressure solenoid valve 40. Rather than bleeding this fluid to the atmosphere, which is undesirable, due to waste, pollution, etc., especially when natural gas is used as a working fluid, it may be sent downstream into the main outlet line 20 via the servo exhaust line 30.

For example, if the pilot set point is less than zero (vacuum) the pilot loading pressure will overcome the spring force to control the downstream pressure at a positive pressure. Specifically, if the spring set point is minus 5 psig and the loading pressure is 15 psig, then the control outlet pressure would be 10 psig.

While the present invention has been described with reference to specific examples, which are intended to be illustrative only and not to be limiting of the invention, it will be apparent of those ordinary skill in the art that changes, additions, or deletions may be made to the disclosed embodiments without departing from the spirit and scope of the invention.

For example, if desired, the servo control valve assembly 16 may be combined with the pilot valve 12 into a complete package.

What is claimed is:

1. A pressure loaded pilot valve system for a regulator valve connecting an inlet line carrying fluid at an inlet pressure to an outlet line carrying fluid at an outlet pressure, the pressure loaded pilot valve system comprising:
    a servo control valve assembly;
    a pilot valve assembly;
    a supply line connected to the servo control valve assembly, carrying fluid at a supply pressure;
    a pilot loading pressure line connecting the servo control valve assembly to the pilot valve assembly, carrying fluid at a pilot loading pressure; and
    an exhaust line connecting the servo control valve assembly to the outlet line, the exhaust line carrying fluid at an exhaust pressure from the servo control valve assembly to the outlet line,
    wherein the pilot valve opens as the pilot loading pressure increases, and a spring bias in the pilot valve assembly opposes the pilot loading pressure.

2. The pressure loaded pilot valve system of claim 1, wherein the servo control valve assembly includes an electronic control unit that is operatively connected to a supply pressure solenoid valve.

3. The pressure loaded pilot valve system of claim 2, wherein the electronic control unit is operatively connected to an exhaust pressure solenoid valve.

4. The pressure loaded pilot valve system of claim 2, wherein the electronic control unit is operatively connected to a loading pressure transducer.

5. The pressure loaded pilot valve system of claim 1, wherein the pilot valve includes a spring to close configuration.

6. A pressure loaded pilot valve system for a regulator valve connecting an inlet line carrying fluid at an inlet pressure to an outlet line carrying fluid at an outlet pressure, the pressure loaded pilot valve system comprising:
    a servo control valve assembly;
    a pilot valve assembly, including a pilot valve plug movable between a closed position and an open position, a pilot valve diaphragm operatively connected to the pilot valve plug and attached to a pilot valve puller post, and a pilot valve spring configured to urge the pilot valve puller post and the pilot valve diaphragm in a direction so as to urge the pilot valve plug toward the closed position;
    a supply line connected to the servo control valve assembly, carrying fluid at a supply pressure;
    a pilot loading pressure line connecting the servo control valve assembly to the pilot valve assembly, carrying fluid at a pilot loading pressure; and
    an exhaust line connecting the servo control valve assembly to the outlet line, carrying fluid at an exhaust pressure,
    wherein the pilot valve opens as the pilot loading pressure increases, and the pilot valve spring produces a spring force that opposes the pilot loading pressure.

7. The pressure loaded pilot valve system of claim 6, wherein the servo control valve assembly includes an electronic control unit that is operatively connected to a supply pressure solenoid valve.

8. The pressure loaded pilot valve system of claim 7, wherein the electronic control unit is operatively connected to an exhaust pressure solenoid valve.

9. The pressure loaded pilot valve system of claim 7, wherein the electronic control unit is operatively connected to a loading pressure transducer.

* * * * *

UNITED STATES PATENT AND TRADEMARK OFFICE
CERTIFICATE OF CORRECTION

PATENT NO. : 7,318,447 B2  Page 1 of 1
APPLICATION NO. : 10/761761
DATED : January 15, 2008
INVENTOR(S) : Stephanie M. Law It is certified that error appears in the above-identified patent and that said Letters Patent is hereby corrected as shown below:

On the Title Page

Item (73), "LLC." should be -- LLC --.

Item (57), line 7, "assembly" should be -- assembly. --.

Signed and Sealed this

Eighteenth Day of May, 2010

David J. Kappos
*Director of the United States Patent and Trademark Office*